United States Patent
Lu et al.

(10) Patent No.: US 11,829,447 B2
(45) Date of Patent: Nov. 28, 2023

(54) RESIDENT AREA PREDICTION METHOD, APPARATUS, DEVICE, AND STORAGE MEDIUM

(71) Applicant: BEIJING BAIDU NETCOM SCIENCE TECHNOLOGY CO., LTD., Beijing (CN)

(72) Inventors: Xinjiang Lu, Beijing (CN); Nengjun Zhu, Beijing (CN); Hui Xiong, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 508 days.

(21) Appl. No.: 17/173,142

(22) Filed: Feb. 10, 2021

(65) Prior Publication Data

US 2021/0192209 A1    Jun. 24, 2021

(30) Foreign Application Priority Data

Sep. 29, 2020   (CN) .......................... 202011049739.3

(51) Int. Cl.
  *G06F 17/18* (2006.01)
  *G06F 18/2323* (2023.01)
  *G06N 3/02* (2006.01)
  *G06F 18/25* (2023.01)

(52) U.S. Cl.
  CPC .......... *G06F 18/2323* (2023.01); *G06F 17/18* (2013.01); *G06F 18/25* (2023.01); *G06N 3/02* (2013.01)

(58) Field of Classification Search
  CPC ...... G06F 18/2323; G06F 17/18; G06F 18/25; G06N 3/02; G06N 3/045
  See application file for complete search history.

(56) References Cited

U.S. PATENT DOCUMENTS

| 11,206,543 | B2 * | 12/2021 | Do | .......... H04L 63/1433 |
| 11,393,192 | B2 * | 7/2022 | Arrabotu | .......... G08G 5/0086 |
| 11,698,261 | B2 * | 7/2023 | Li | .......... G06N 20/00 701/426 |
| 2022/0028557 | A1 * | 1/2022 | Klasson | .......... H04W 4/025 |

OTHER PUBLICATIONS

Liu et al, "English translation of CN111325099A" (Year: 2020).*

* cited by examiner

*Primary Examiner* — Phuoc Tran
(74) *Attorney, Agent, or Firm* — J.C. PATENTS (57) ABSTRACT

This disclosure discloses a resident area prediction method, apparatus, device and storage medium, involving artificial intelligence technology, big data, deep learning and multi-task learning. The specific implementation plan is: acquiring a resident area data of a target user, and the resident area data including the resident area of the target user and the corresponding resident time; obtaining an association relationship between the resident areas of the target user by inputting the resident area data into an area relationship model, and the area relationship model is used to reflect a position relationship between the areas; determining a time-sequence relationship between the areas visited by the target user, according to the association relationship, the resident time and the visiting POI data; predicting a target resident area of the target user, according to the time-sequence relationship and the basic attribute information of the target user.

20 Claims, 5 Drawing Sheets

RESIDENT AREA PREDICTION METHOD, APPARATUS, DEVICE, AND STORAGE MEDIUM

CROSS-REFERENCE TO RELATED APPLICATIONS

This application claims priority to Chinese Patent Application No. 202011049739.3, filed on Sep. 29, 2020, which is hereby incorporated by reference in its entirety.

TECHNICAL FIELD

Embodiments of the present disclosure relate to artificial intelligence technology, big data, deep learning, and multi-task learning in the computer field and, in particular, to a resident area prediction method, an apparatus, a device, and a storage medium.

BACKGROUND

Resident area prediction has great practical significance and application value. For example, understanding and inferring a user's next possible resident area is highly beneficial to prevention and control for social security, such as epidemic prevention and control; in addition, the resident area prediction has great practical guiding significance for urban planning, urban governance, and formulation and implementation of public policies; and furthermore, the user resident area prediction can help businesses conduct more accurate localized advertising and recommendation.

Currently, the prediction of the user's resident area is limited to manual methods such as questionnaire surveys of a small sample of users.

SUMMARY

The disclosure provides a resident area prediction method, an apparatus, a device and a storage medium for quickly and accurately predicting a resident area of a user.

According to a first aspect of this disclosure, a resident area prediction method is provided, including:
  acquiring resident area data and visiting POI (Point of Interest, called as POI) data of a target user, where the resident area data includes resident areas and corresponding resident times of the target user;
  inputting the resident area data into an area relationship model to obtain an association relationship between the resident areas of the target user, where the area relationship model is configured to reflect a position relationship between areas;
  determining a time-sequence relationship between areas visited by the target user, according to the association relationship, the resident times and the visiting POI data; and
  predicting a target resident area of the target user, according to the time-sequence relationship and basic attribute information of the target user.

According to a second aspect of the present disclosure, a method for constructing an area relationship model is provided, including:
  obtaining resident areas of a user; and
  constructing the area relationship model according to the resident areas, where the area relationship model is configured to reflect a position relationship between the areas.

According to a third aspect of this disclosure, there is provided a resident area prediction apparatus, including:
  an acquiring module, configured to acquire resident area data and visiting POI data of a target user, where the resident area data includes resident areas and corresponding resident times of the target user;
  a first processing module, configured to input the resident area data into an area relationship model to obtain an association relationship between the resident areas of the target user, where the area relationship model is configured to reflect a position relationship between areas;
  a second processing module, configured to determine a time-sequence relationship between areas visited by the target user, according to the association relationship, the resident times and the visiting POI data; and
  a third processing module, configured to predict a target resident area of the target user, according to the time-sequence relationship and basic attribute information of the target user.

According to a fourth aspect of the present disclosure, an apparatus for constructing an area relationship model is provided, including:
  an acquiring module, configured to obtain resident areas of a user; and
  a processing module, configured to construct the area relationship model according to the resident areas, where the area relationship model is configured to reflect a position relationship between areas.

According to a fifth aspect of the present disclosure, an electronic device is provided, including:
  at least one processor; and
  a memory communicatively connected with the at least one processor; where
  the memory stores instructions executable by the at least one processor, and the instructions are executed by the at least one processor to enable the at least one processor to execute the method described in any one of the first aspect or the second aspect.

According to a sixth aspect of the present disclosure, a non-transitory computer-readable storage medium storing computer instructions is provided, where the computer instructions are used to cause the computer to execute the method according to any one of the first aspect or the second aspect.

Technologies according to this disclosure solves the problem of low efficiency and poor accuracy of prediction results in predicting user's resident area through manual methods such as questionnaire surveys of a small sample of users, and improves the accuracy and efficiency of the user resident area prediction.

It should be understood that the contents described in this section is not intended to identify the key or important features of the embodiments of the disclosure, or limit the scope of the disclosure. Other features of this disclosure will be easily understood through the following description.

BRIEF DESCRIPTION OF THE DRAWINGS

The drawings are used for a better understanding of the solution, and do not constitute a limitation to the disclosure, where.

DESCRIPTION OF EMBODIMENTS

The following describes exemplary embodiments of the present disclosure in combination with the accompanying drawings, which includes various details of the embodiments of the present disclosure to facilitate understanding, and should be considered as merely exemplary. Therefore, those of ordinary skill in the art should realize that various changes and modifications can be made to the embodiments described herein without departing from the scope and spirit of the present disclosure. Similarly, for clarity and conciseness, descriptions of well-known functions and structures are omitted in the following description.

A resident area of a user refers to an area where the user frequently moves for a relatively long period of time, for example, Haidian District, in Beijing city. Exemplarily, an area where the user's home or company is located can be considered as the user's resident area. The user's resident area is relatively stable, but it will also change over time. This phenomenon of the user's resident area change can be considered as a user migration behavior.

As described above, the user resident area prediction has great practical significance and application value. In addition, compared to analyzing the user's resident position, such as an exact position of the user's home and company, focusing on the user's resident area can protect the user's personal privacy to a certain extent. But currently, the prediction of the user's resident area is limited to manual methods such as questionnaire surveys of a small sample of users. The manual method is inefficient, and the accuracy of the prediction result thereof is low.

In addition, with the popularization of smart terminals and the development of positioning technologies, urban data centers have accumulated more and more position-based related data. Using these massive data, the user's resident areas are detectable, and future changes of the user's resident areas are inferable through multi-source data fusion.

Therefore, based on the above, this disclosure provides a resident area prediction method, an apparatus, a device and a storage medium, which are applied to artificial intelligence technologies, big data, deep learning and multi-task learning in the computer field, and effectively improve prediction efficiency through automated processing, and improve prediction accuracy based on big data analysis. The method is a data-driven end-to-end prediction method.

Predicting a resident area of a user allows better protecting the user's personal privacy than predicting a position of the user.

Detailed embodiments are used in the following to illustrate how this disclosure predicts a resident area of a user.

Embodiment 1

Figure 1:
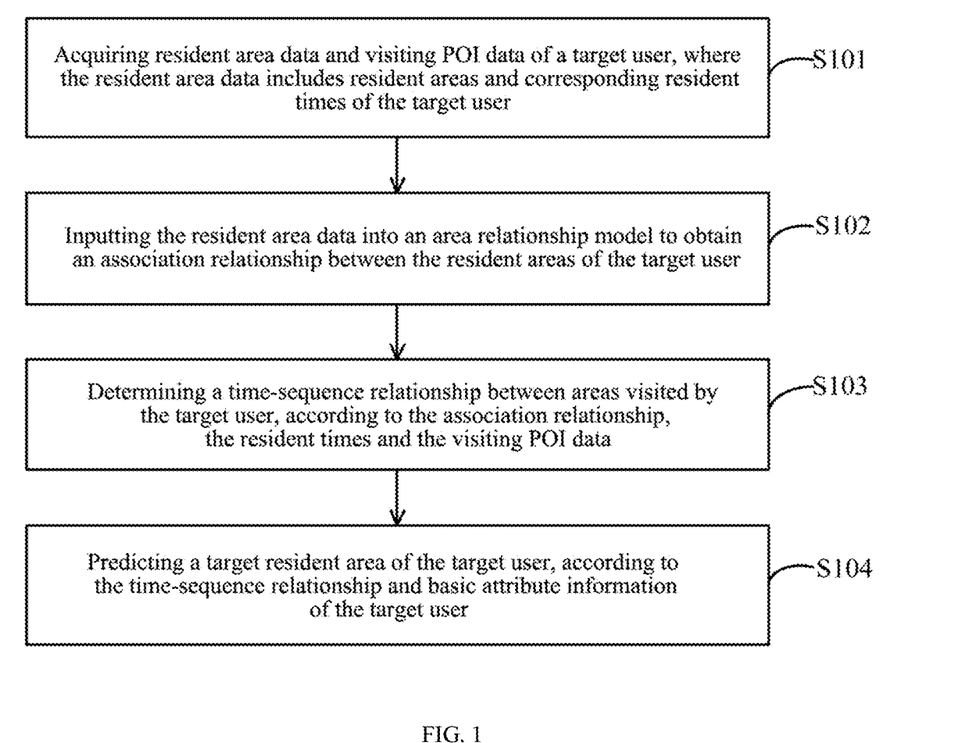
FIG. 1 is a schematic diagram according to a first embodiment of the present disclosure.

FIG. 1 is a schematic diagram according to a first embodiment of the present disclosure. The embodiment of the disclosure provides a resident area prediction method, which is executable by a resident area prediction apparatus. The resident area prediction apparatus may specifically be an electronic device, or may be built in the electronic device. For example, the resident area prediction apparatus is a chip in the electronic device, and so on. An electronic device is intended to represent various forms of digital computers, such as laptop computers, desktop computers, workbenches, personal digital assistants (called PDAs, or "handheld computers"), servers, blades servers, mainframe computers, and other suitable computers.

As shown in FIG. 1, the resident area prediction method includes the following steps:

S101: acquiring resident area data and visiting POI data of a target user, where the resident area data includes resident areas and corresponding resident times of the target user.

In practical applications, for acquiring the resident area data, the user's position information can be acquired from devices such as a smart terminal used by the target user, and then an area where the position is located can be determined. It should be understood that the area is of a larger range relative to the position. For example, the position of the target user's home is within the municipality of Haidian District, and then its resident area is Haidian District. In addition, the resident area of the target user is not fixed. For example, an area where the target user's company is located is different from an area where the target user's home is located. At this time, there are two or more resident areas corresponding to the target user.

POI refers to entities with geographic position information in the real physical world, such as shops, schools, banks, restaurants, gas stations, hospitals, or supermarkets. When the target user visits a point of interest, the visiting POI data can be acquired from the smart terminal and other devices used by the target user.

Specifically, the resident area and the visiting POI can be acquired through the positioning technology of the mobile phone and other devices, and then the resident time can be determined according to the time of the target user in the resident area.

The foregoing resident area data and visiting POI data are usually reported to a server by an electronic device and stored by the server. When in use, the electronic device can acquire these data by communicating with the server.

It should be noted that the above example for illustration is based on taking a municipal district as the resident area, but this disclosure is not limited thereby, that is, the resident area can also be of a smaller or larger range than the municipal district. Exemplarily, the resident area may be a larger area than a municipal district, for example, a city or province; alternatively, the resident area may be a smaller area than the municipal district, for example, a street, and so on.

In addition, the resident area data and the visiting POI data are based on conversion of resident area information and visiting POI information into numeric values, where the resident area information and the visiting POI information are quantized into specific values or vectors to obtain the resident area data corresponding to the resident area information and the visiting POI data corresponding to the visiting POI information.

S102: inputting the resident area data into an area relationship model to obtain an association relationship between the resident areas of the target user.

The area relationship model is configured to reflect a position relationship between areas. The area relationship model is constructed based on a large number of migration behaviors of the user (that is, the change of the user's resident area). A process of constructing the model is described in subsequent embodiments, and its performance meets actual needs. Embodiments of the present disclosure use an area relationship model with good performance to learn the association relationship between the resident areas of the target user, allowing for a relatively accurate prediction result.

Specifically, the resident area data of the target user is input to the area relationship model, and an output of the area relationship model then reflects the association relationship between the resident areas of the target user. For example, at a certain time, the target user migrates from a resident area A to a resident area B, and so on.

Exemplarily, the area relationship model may be specifically a dual path graph convolutional network (called DGCN), which can also be called a dynamic graph convolutional network, and with the aid of DGCN, dynamic representations of different resident areas at different times can be obtained.

S103: determining a time-sequence relationship between areas visited by the target user, according to the association relationship, the resident times and the visiting POI data.

It should be understood that the association relationship reflects a relationship between the resident areas of the target user, and is a learning of a historical resident area of the target user, where the relationship between these resident areas in a spatial dimension is learned. The time-sequence relationship between the areas visited by the target user is obtained on this basis in combination with the resident times (i.e., time dimension) of the target user in the resident areas and the visiting POI data. Here, the area visited by the user includes the foregoing resident areas and the visiting POI.

And the visiting POI data reflects a visiting intention of the target user. From the visiting intention and the learned relationship, whether the target user tends to take an area where the visiting POI is located as the target resident area is inferable. In addition, the visiting POI data also includes the visiting time corresponding to the visiting POI, so it is also possible to further determine in which time period the target user resides in the target resident area. The foregoing information can be reflected by the time-sequence relationship.

S104: predicting a target resident area of the target user, according to the time-sequence relationship and basic attribute information of the target user.

The basic attribute information may include, but is not limited to, basic information such as anonymous ID, age, gender, and occupation.

In this step the resident area of the target user is predicted based on the time-sequence relationship between the areas visited by the target user in combination with the basic attribute information of the target user, allowing the prediction result more suitable for the target user.

It can be seen that, in the embodiment of the disclosure, after the resident area data and the corresponding resident times of the target user are acquired, where the resident area data includes the resident areas of the target user, the resident area data is input into an area relationship model to obtain an association relationship between the resident areas of the target user, and according to the association relationship, the resident times and the visiting POI data, the time-sequence relationship between the areas visited by the target user is determined, and the target resident area of the target user is predicted according to the time-sequence relationship and the basic attribute information of the target user. Compared with the prior art, on the one hand, the process of automatic execution of the resident area prediction through electronic device allows for improving the rapid prediction of a resident area of a user. On the other hand, since the area relationship model is obtained based on big data training, the present disclosure also allows for effectively improving the accuracy of predicting a resident area of a user.

On the basis of the foregoing embodiment, in order to better understand each step shown in FIG. 1, a detailed description is given in a second embodiment below.

Embodiment 2

Figure 2:
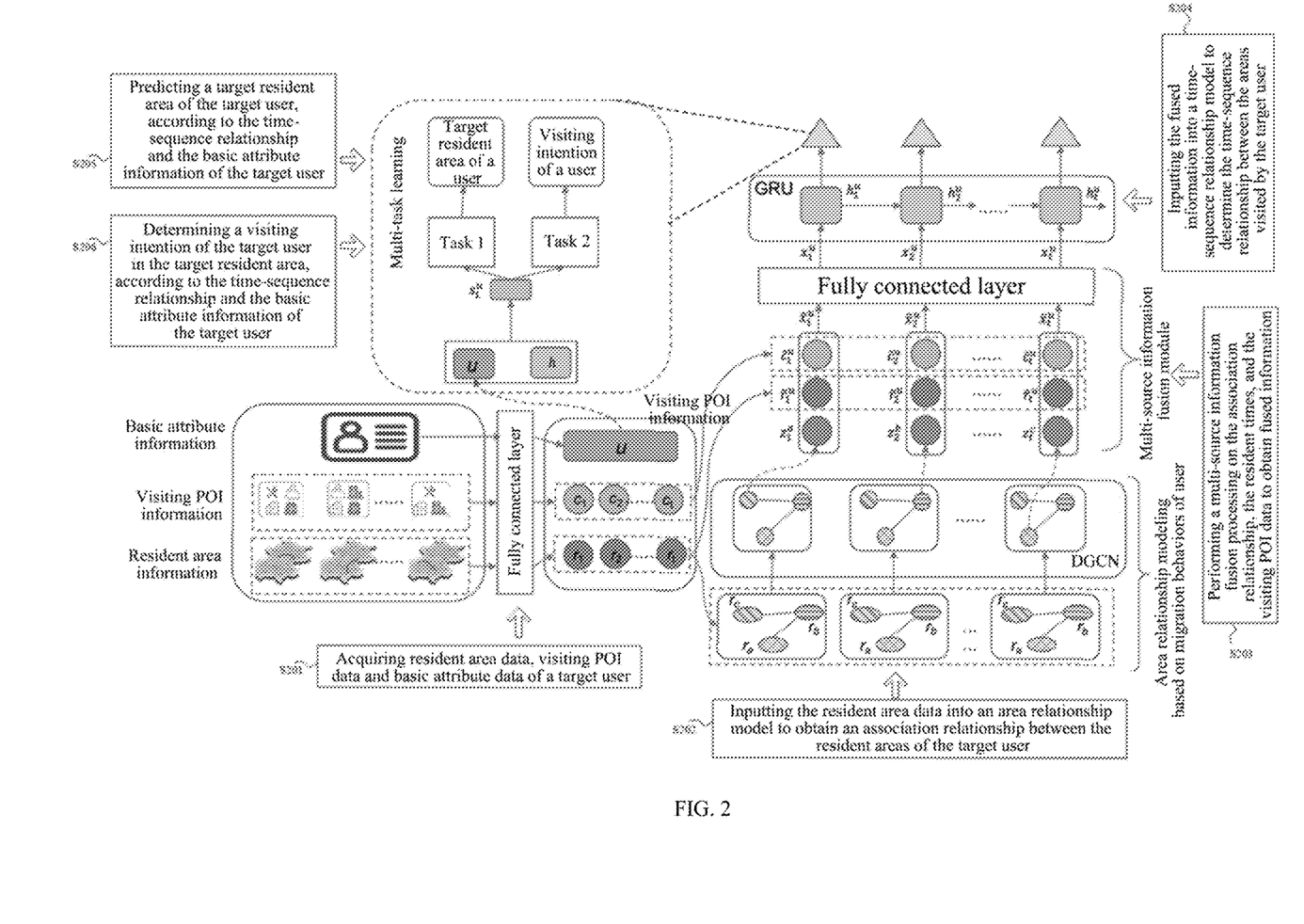
FIG. 2 is a schematic diagram according to a second embodiment of the present disclosure.

FIG. 2 is a schematic diagram according to a second embodiment of the present disclosure. Referring to FIG. 2, the resident area prediction method may include the following steps:

S201: acquiring resident area data, visiting POI data and basic attribute data of a target user.

The relevant descriptions of the resident area data and the visiting POI data are as described above, and will not be repeated here. The basic attribute data is based on converting the basic attribute information of the target user into numeric values, where the basic attribute information is quantized into specific values or vectors to obtain the basic attribute data corresponding to the basic attribute information.

Exemplarily, as shown in FIG. 2, the conversion into numeric values is realized through a fully connected layer. Specifically, the acquired original data (that is, the basic attribute information, the resident area information, and the visiting POI information) are mapped through the fully connected layer to obtain an initial representation vector u corresponding to the basic attribute information and an initial representation vector c corresponding to the visiting POI information and an initial representation vector r corresponding to the resident area information.

S202: inputting the resident area data into an area relationship model to obtain an association relationship between the resident areas of the target user.

Optionally, this step may include: obtaining resident area association relationships at different times, according to the resident area data; obtaining association relationships of different resident areas at different times, according to the area relationship model; and obtaining the association relationship between the resident areas of the target user, according to the resident areas at different times.

It can be understood that the migration behavior of the user, that is, the change of the user's resident area, implicitly portrays a relationship between the resident areas. In order to characterize the dynamic association relationship between areas reflected by user migration, DGCN can be used in this disclosure to learn the dynamic association relationship between the areas. With the aid of the area relationship model, a dynamic representation of different resident areas at different times can be obtained; the association relationship between the resident areas of the target user, that is, an area relationship representation vector z, is obtained, according to the resident areas at different times. It should be noted that this representation is a dynamic representation, that is, for a same area, the area relationship representation vector at different times is different.

S203: performing a multi-source information fusion processing on the association relationship, the resident times, and the visiting POI data to obtain fused information.

Optionally, this step may include: performing a pooling processing on the resident times and the visiting POI data respectively to obtain an intermediate representation vector; and performing a vector splicing processing on the intermediate representation vector and the association relationship to obtain the fused information.

In one implementation, through a multi-source information fusion module, based on the user's recent visiting POI data and resident area data, the corresponding initial representation vector c and initial representation vector r are respectively aggregated to obtain aggregated representation vectors $\tilde{c}$ and $\tilde{r}$. Then, the aforementioned representation vectors $\tilde{c}$ and $\tilde{r}$ and the area relationship representation vector z are further aggregated to obtain a representation vector $\tilde{x}$. The representation vector $\tilde{x}$ is input to a fully connected layer to obtain an output representation vector x of the multi-source information fusion module, which is the fused information. Subscripts in FIG. 2 represent different times, for example, time 1, time 2, . . . , time t; a superscript u represents the target user; a, b, and c represent different areas.

Referring to FIG. 2, since a user is usually associated with multiple POIs and multiple previous resident areas, it is necessary to perform aggregation operations (for example, a uniform pooling method) on multiple initial representation vectors $c_i$ of the target user, where i takes the values 1, 2, . . . , t, to obtain an intent representation vector $\tilde{c}_i^u$. Similarly, the user's multiple initial representation vectors $r_i$ are aggregated to obtain an area representation vector $\tilde{r}_i^u$; then the target user's area relationship representation vector z, aggregated intention representation vector $\tilde{c}_i^u$, and aggregated area representation vector $\tilde{r}_i^u$ are spliced together to obtain a multi-source information fusion representation vector $\tilde{x}_i^u$; and then a compressed representation vector $\tilde{x}_i^u$ is obtained through a fully connected layer.

S204: inputting the fused information into a time-sequence relationship model to determine the time-sequence relationship between the areas visited by the target user.

The time-sequence relationship model is configured to reflect a time-sequence relationship of user migration behaviors.

Exemplarily, the representation vectors $x_{1,i}^u$ at different times are input to a sequence information modeling module, and the sequence information modeling module includes the time-sequence relationship model. Here, a Gated Recurrent Unit (called GRU) is used as the time-sequence relationship model to model time-sequence information in the user's migration behaviors. Through the sequence information modeling module, a time-dependent hidden variable h, that is, the time sequence relationship between the areas visited by the target user, is output. The GRU can automatically adjust information flow through gating parameters to realize automatic forgetting and remembering of information.

S203 and S204 are further refinements of S103 in the first embodiment.

S205: predicting a target resident area of the target user, according to the time-sequence relationship and the basic attribute information of the target user.

In some embodiments, this step may include: performing an aggregation processing on the time-sequence relationship and the basic attribute information of the target user; obtaining resident probabilities of the target user in different areas according to a result of the aggregation processing and a task for resident area prediction; and predicting the target resident area of the target user according to the resident probabilities of the target user in different areas.

Illustratively, the initial representation vector u and the hidden variable h at a specific time output by the sequence information modeling module are spliced with the softmax function to obtain a representation vector $s_1^u$; and the aggregated representation vector $s_1^u$ is used as input for the task of the user resident area prediction.

Furthermore, the foregoing performing an aggregation processing on the time-sequence relationship and the basic attribute information of the target user may include: converting the basic attribute information of the target user into numeric values to obtain basic attribute data corresponding to the basic attribute information; and performing an aggregation processing on the time-sequence relationship and the basic attribute data.

In addition, the resident area prediction method may also include:

S206: determining a visiting intention of the target user in the target resident area, according to the time-sequence relationship and the basic attribute information of the target user.

This step may also include: performing an aggregation processing on the time-sequence relationship and the basic attribute information of the target user; obtaining a visiting intention probability of the target user in the target resident area, according to a result of the aggregation processing and a task for user visiting intention prediction; and determining the visiting intention of the target user in the target resident area, according to visiting intention probabilities of the target user corresponding to different categories of points of interest POI in the target resident area.

The representation vector $s_1^u$ is used for two tasks of the user resident area prediction and the user visiting intention prediction respectively (described as task 1 and task 2 respectively). Since user resident area is closely related to user visiting POI information, a better resident area prediction with dynamic perception of area relationships is achievable through multi-task learning technologies with the use of mutual promotion between the two tasks. Moreover, as a by-product of the resident area prediction, the user's visiting intention is also predicted, so that a certain interpretable support can be provided for the resident area prediction.

In summary, the data-driven resident area prediction method based on deep learning and multi-task learning technologies proposed in the embodiments of the present disclosure allows for effective user resident area prediction.

In the embodiment of the present disclosure, a pure data-driven resident area prediction method is realized by fusing data from multiple sources, without pre-assuming the rules of user migration behaviors; in addition, the solution allows for the prediction of the resident area of individual users, and the solution merely provides the resident area prediction, which, on one hand, allows for high accuracy prediction, and on the other hand, also protects the privacy of users.

Embodiment 3

An area relationship model is used in the foregoing embodiments, and therefore, an embodiment of the present disclosure also provides a method for constructing the area relationship model.

Figure 3:
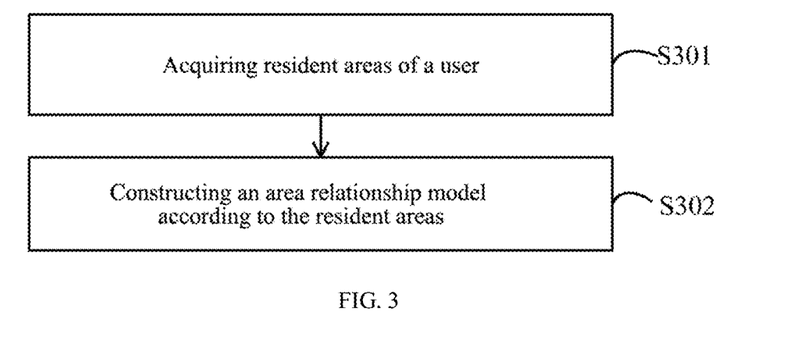
FIG. 3 is a schematic diagram according to a third embodiment of the present disclosure.

FIG. 3 is a schematic diagram according to a third embodiment of the present disclosure. The embodiment of the present disclosure provides a method for constructing the area relationship model, which can be executed by an apparatus for constructing the area relationship model. The apparatus for constructing the area relationship model may be specifically an electronic device, or may be built in the electronic device. For example, the apparatus for constructing the area relationship model is a chip in an electronic device, and so on. The electronic device is intended to represent various forms of digital computers, such as laptop computers, desktop computers, workbenches, PDA, servers, blades servers, mainframe computers, and other suitable computers.

As shown in FIG. 3, the method of constructing the area relationship model includes:

S301: acquiring resident areas of a user; and

S302: constructing the area relationship model according to the resident areas.

The area relationship model is configured to reflect a position relationship between areas.

Specifically, area relationships at different times are constructed according to the resident areas of the user; an area relationship at each time is used as an input of the area relationship model, so that the area relationship model at each time is associated according to the time-dependent relationship, and then the area relationship model is obtained through end-to-end training by sharing parameters.

Optionally, the constructing the area relationship model according to the resident areas comprises: modeling a dynamic association relationship between the resident areas based on a DGCN to generate the area relationship model.

Embodiment 4

Figure 4:
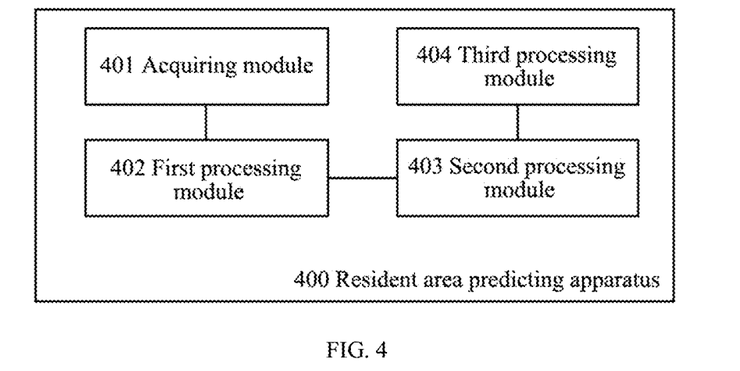
FIG. 4 is a schematic diagram according to a fourth embodiment of the present disclosure.

FIG. 4 is a schematic diagram according to a fourth embodiment of the present disclosure. This embodiment provides a resident area prediction apparatus. As shown in FIG. 4, a resident area prediction apparatus 400 includes: an acquiring module 401, a first processing module 402, a second processing module 403, and a third processing module 404. The acquiring module 401 is configured to acquire resident area data and visiting POI data of a target user, where the resident area data includes resident areas and corresponding resident times of the target user.

The first processing module 402 is configured to input the resident area data into an area relationship model to obtain an association relationship between the resident areas of the target user, where the area relationship model is configured to reflect a position relationship between areas.

The second processing module 403 is configured to determine a time-sequence relationship between areas visited by the target user, according to the association relationship, the resident times and the visiting POI data.

The third processing module 404 is configured to predict a target resident area of the target user, according to the time-sequence relationship and basic attribute information of the target user.

The resident area prediction apparatus provided in this embodiment can be used to implement the foregoing method embodiments for predicting a resident area, and its implementation and technical effects are similar, and details are not described herein again in this embodiment.

In some embodiments, the first processing module may be specifically configured to: obtain resident area association relationships at different times, according to the resident areas and the corresponding resident times; obtain association relationships of different resident areas at different times, according to the area relationship model; and obtain the association relationship between the resident areas of the target user, according to the resident area data at different times.

Embodiment 5

Figure 5:
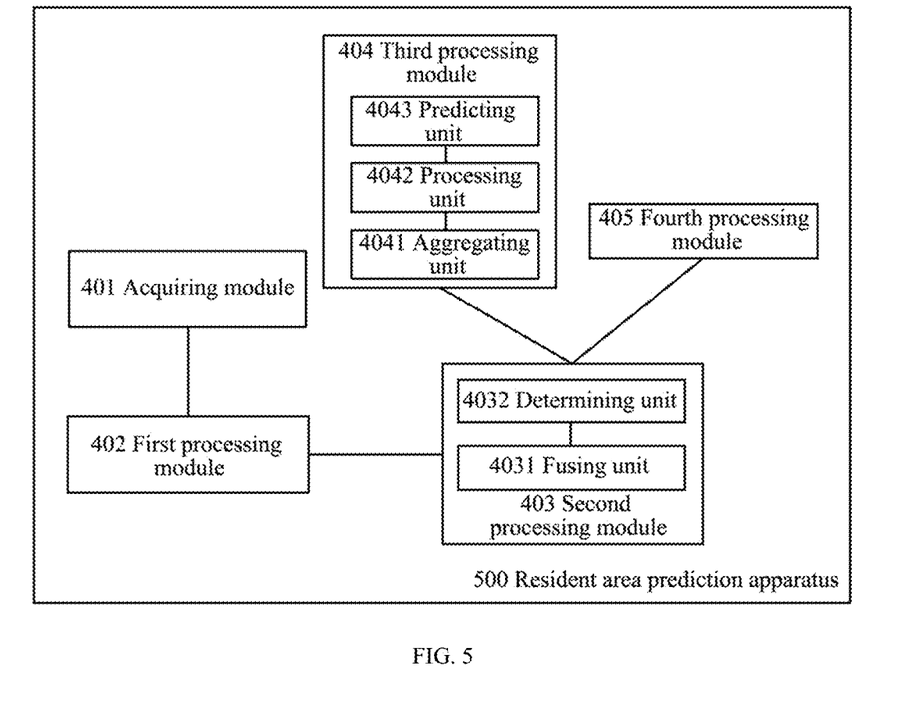
FIG. 5 is a schematic diagram according to a fifth embodiment of the present disclosure.

FIG. 5 is a schematic diagram according to a fifth embodiment of the present disclosure. Referring to FIG. 5, based on the structure shown in FIG. 4, in a resident area prediction apparatus 500, the second processing module 403 may include:

a fusing unit 4031, configured to perform a multi-source information fusion processing on the association relationship, the resident times, and the visiting POI data obtain fused information;

a determining unit 4032, configured to input the fused information into a time-sequence relationship model to determine the time-sequence relationship between the areas visited by the target user, where the time-sequence relationship model is configured to reflect a time-sequence relationship of user migration behaviors.

Optionally, the fusing unit 4031 is specifically configured to: perform a pooling processing on the resident times and the visiting POI data respectively to obtain an intermediate representation vector; and perform a vector splicing processing on the intermediate representation vector and the association relationship to obtain the fused information.

Still referring to FIG. 5, the third processing module 404 may further include:

an aggregating unit 4041, configured to perform an aggregation processing on the time-sequence relationship and the basic attribute information of the target user;

a processing unit 4042, configured to obtain resident probabilities of the target user in different areas according to a result of the aggregation processing and a task for resident area prediction; and a predicting unit 4043, configured to predict the target resident area of the target user according to the resident probabilities of the target user in different areas.

Furthermore, the aggregating unit 4041 may be specifically configured to:

converting the basic attribute information of the target user into numeric values to obtain basic attribute data corresponding to the basic attribute information; and perform an aggregation processing on the time-sequence relationship and the basic attribute data.

On the basis of the foregoing embodiment, in a possible implementation, the resident area prediction apparatus 500 may further include: a fourth processing module 405, configured to determine a visiting intention of the target user in the target resident area, according to the time-sequence relationship and the basic attribute information of the target user.

Optionally, the fourth processing module 405 may be specifically configured to: perform an aggregation processing on the time-sequence relationship and the basic attribute information of the target user; obtain a visiting intention probability of the target user in the target resident area, according to a result of the aggregation processing and a task for user visiting intention prediction; and determine the visiting intention of the target user in the target resident area, according to visiting intention probabilities of the target user corresponding to different POIs in the target resident area.

Optionally, the acquiring module 401 may be specifically configured to: converting resident area information and visiting POI information of the target user into numeric values respectively to obtain the resident area data corresponding to the resident area information and the visiting POI data corresponding to the visiting POI information.

Embodiment 6

Figure 6:
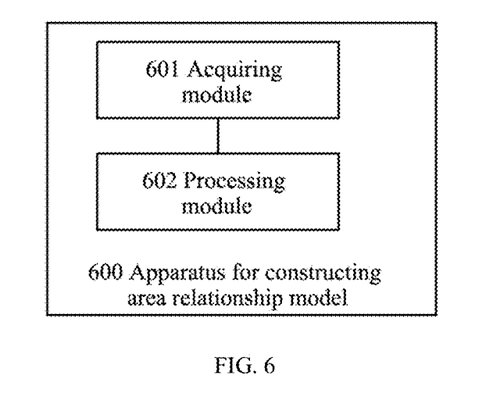
FIG. 6 is a schematic diagram according to a sixth embodiment of the present disclosure.

FIG. 6 is a schematic diagram according to a sixth embodiment of the present disclosure. This embodiment provides an apparatus for constructing an area relationship model. As shown in FIG. 6, an apparatus 600 for constructing the area relationship model includes: an acquiring module 601 and a processing module 602. The acquiring module 601 is configured to acquire resident areas of a user.

The processing module 602 is configured to construct the area relationship model according to the resident areas, where the area relationship model is configured to reflect a position relationship between areas.

The apparatus for constructing the area relationship model provided in this embodiment can be used to implement the foregoing method embodiment for constructing the area relationship model, and its implementation and technical effects are similar, and details are not described herein again in this embodiment.

In some embodiments, the processing module 602 may be specifically configured to: model a dynamic association relationship between the resident areas based on a DGCN to generate the area relationship model.

According to embodiments of the present disclosure, the present disclosure also provides an electronic device and a readable storage medium.

Figure 7:
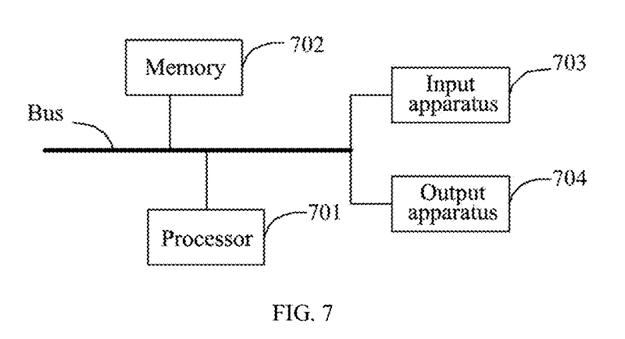
FIG. 7 is a block diagram of an electronic device for implementing the resident area prediction method and/or the method of constructing an area relationship model according to an embodiment of the present disclosure.

As shown in FIG. 7, it is a block diagram of an electronic device for implementing the resident area prediction and/or constructing an area relationship model according to an embodiment of the present disclosure. The electronic device is intended to represent various forms of digital computers, such as laptop computers, desktop computers, workbenches, PDA, servers, blades servers, mainframe computers, and other suitable computers. The electronic device may also represent various forms of mobile apparatuses, such as personal digital processing, cellular phones, smart phones, wearable devices, and other similar computing apparatuses. The components, connections and relationships, and functions thereof shown herein are merely examples, and are not intended to limit the implementation of the disclosure described and/or required herein.

As shown in FIG. 7, the electronic device includes: one or more processors 701, a memory 702, and interfaces for connecting various components thereof, including high-speed interfaces and low-speed interfaces. The various components are connected to each other by using different buses, and can be installed on a common motherboard or installed in other ways as required. The processor may process instructions executed in the electronic device, including instructions stored in or on the memory to display graphical information of the GUI on an external input/output device (such as a display device coupled to an interface). In other embodiments, multiple processors and/or multiple buses may be used with multiple memories if necessary. Similarly, multiple electronic devices can be connected, and each device provides some necessary operations (for example, as a server array, a group of blade servers, or a multi-processor system). A processor 701 is taken as an example in FIG. 7.

The memory 702 is a non-transitory computer-readable storage medium provided by this disclosure. The memory stores instructions executable by at least one processor, so that the at least one processor executes the resident area prediction method and/or the method for constructing the area relationship model provided by this disclosure. The non-transitory computer-readable storage medium of the present disclosure stores computer instructions, which are used to enable the computer to execute the resident area prediction method and/or method for constructing the area relationship model provided by the present disclosure.

The memory 702, as a non-transitory computer-readable storage medium, may be used to store non-transitory software programs, non-transitory computer-executable programs and modules, such as corresponding program instructions/modules in the resident area prediction method in the embodiment of the present disclosure (for example, the acquiring module 401, the first processing module 402, the second processing module 403, and the third processing module 404 shown in FIG. 4). The processor 701 executes various functional applications and data processing of the server by running non-transient software programs, instructions, and modules stored in the memory 702, that is, the resident area prediction method and/or the method for constructing the area relationship model in the foregoing method embodiments are implemented.

The memory 702 may include a program storage area and a data storage area, where the program storage area may store an application program required by an operating system and at least one function; the storage data area may store data created by the use of electronic devices according to the resident area prediction and/or the construction of the area relationship model. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to an electronic device for resident area prediction and/or construction of the area relationship model through a network. Examples of the aforementioned networks include, but are not limited to, the Internet, corporate intranets, local area networks, mobile communication networks, and combinations thereof.

The electronic device for the resident area prediction method and/or the method for constructing the area relationship model may also include: an input apparatus 703 and an output apparatus 704. The processor 701, the memory 702, the input apparatus 703, and the output apparatus 704 may be connected by a bus or in other ways. In FIG. 7, the connection by a bus is taken as an example.

The input apparatus 703 may receive input digital or character information, and generate key signal input related to the user settings and function control of the electric device for the resident area prediction and/or the method for constructing the area relationship model, such as a touch screen, a keypad, a mouse, a track-pad, a touch pad, a pointing stick, one or more mouse buttons, a trackball, a joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein can be implemented in digital electronic circuit systems, integrated circuit systems, application specific ASICs (application specific integrated circuits), computer hardware, firmware, software, and/or combinations thereof. These various implementations may include: implementation in one or more computer programs that can be executed and/or interpreted on a programmable system including at least one programmable processor. The programmable processor may be a dedicated or general programmable processor, which can receive data and instructions from a storage system, at least one input apparatus, and at least one output apparatus, and transmit the data and instructions to the storage system, the at least one input apparatus, and the at least one output apparatus.

These computer programs (also called programs, software, software applications, or codes) include machine instructions for programmable processors, and high-level procedures and/or object-oriented programming languages, and/or assembly/machine language can be used to implement these computer programs. As used herein, the terms "machine-readable medium" and "computer-readable medium" refer to any computer program product, device, and/or apparatus used to provide machine instructions and/or data to a programmable processor (For example, magnetic disks, optical disks, memory, programmable logic devices (PLD)), including machine-readable media that receive machine instructions as machine-readable signals. The term "machine-readable signal" refers to any signal used to provide machine instructions and/or data to a programmable processor.

In order to provide interaction with users, the systems and techniques described here can be implemented on a computer that has: a display apparatus used to display information to users (for example, CRT (Cathode Ray Tube) or LCD (Liquid Crystal Display) monitors); and a keyboard and a pointing apparatus (for example, a mouse or a trackball), through which the user can provide input to the computer. Other types of devices can also be used to provide interaction with users; for example, the feedback provided to the user can be any form of sensory feedback (for example, visual feedback, auditory feedback, or tactile feedback); and any form (including sound input, voice input or tactile input) can be used to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the user can interact with the implementation of the system and technology described herein), or a computing system including any combination of such back-end components, middleware components, or front-end components. The components of the system can be connected to each other through any form or medium of digital data communication (for example, a communication network). Examples of communication networks include: local area network (LAN), wide area network (WAN), and the Internet.

The computer system can include clients and servers. The clients and servers are generally far away from each other and usually interact through a communication network. The relationship between the clients and the servers is generated through computer programs running on the corresponding computers and having a client-server relationship with each other.

Figure 8:
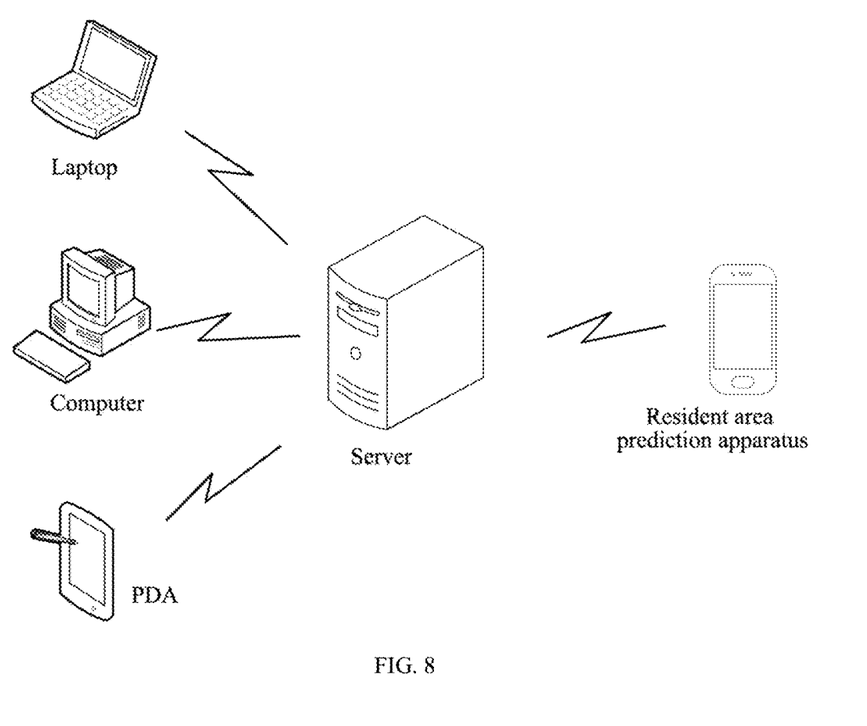
FIG. 8 is a scene diagram of implementing the resident area prediction and/or the construction of an area relationship model according to an embodiment of the present disclosure.

FIG. 8 is a scene diagram of implementing the resident area prediction according to an embodiment of the present disclosure. Referring to FIG. 8, the scene includes a resident area prediction apparatus, a server, and multiple electronic devices: a computer, a laptop and a PDA. The resident area prediction apparatus may be an electronic device such as a smart phone. For example, the resident area prediction apparatus may include an acquiring module, a first processing module, a second processing module, and a third processing module, wherein the first processing module stores an area relationship model. When the resident area prediction apparatus predicts the target resident area of the target user, first the resident area data of the target user may be obtained from the server through the acquiring module where the resident area data is transmitted to the server by the electronic device related to the target user; and the resident area data is input into the area relationship model in the first processing module; and the association relationship between the resident areas of the target user is obtained through the area relationship model, and then conveyed to the second processing module; after that, the second processing module determines the time-sequence relationship between different areas according to the association relationship and the resident times of the target user in the resident areas; and finally, the third processing module predicts the target resident area of the target user according to the time-sequence relationship and the basic attribute information of the target user.

In the scenario shown in FIG. 8, a smart phone is taken as an illustrative example for the resident area prediction apparatus, but this disclosure is not limited thereby. In addition, this disclosure does not limit the number of servers and electronic devices in the scene, and the specific requirements shall prevail. For example, the servers can be replaced with server clusters, and so on.

According to the technical solution of the embodiments of the present disclosure, resident area data and visiting point of interest POI data of a target user are acquired, where the resident area data includes resident areas and corresponding resident times of the target user; the resident area data is input into an area relationship model to obtain an association relationship between the resident areas of the target user, where the area relationship model is configured to reflect a position relationship between areas; a time-sequence relationship between areas visited by the target user is determined, according to the association relationship, the resident times and the visiting POI data; and a target resident area of the target user is predicted, according to the time-sequence relationship and basic attribute information of the target user, which allows for quick and accurate user resident area prediction.

It should be understood that the various forms of processes shown above can be used to reorder, add or delete steps. For example, the steps described in the present disclosure can be executed in parallel, sequentially, or in a different order, as long as the desired result of the technical solution disclosed in the present disclosure can be achieved, this is not limited herein.

The foregoing specific implementations do not constitute a limitation on the protection scope of the present disclosure. Those skilled in the art should understand that various modifications, combinations, sub-combinations, and substitutions can be made according to design requirements and other factors. Any amendments, equivalent substitutions and improvements made within the spirit and principles of this disclosure shall be included in the scope of protection of this disclosure.

What is claimed is:

1. A resident area prediction method, comprising:
   acquiring resident area data and visiting point of interest (POI) data of a target user, wherein the resident area data comprises resident areas and corresponding resident times of the target user;
   inputting the resident area data into an area relationship model to obtain an association relationship between the resident areas of the target user, wherein the area relationship model is configured to reflect a position relationship between areas;
   determining a time-sequence relationship between areas visited by the target user, according to the association relationship, the resident times and the visiting POI data; and
   predicting a target resident area of the target user, according to the time-sequence relationship and basic attribute information of the target user.

2. The method according to claim 1, wherein the inputting the resident area data into an area relationship model to obtain an association relationship between the resident areas of the target user comprises:
   obtaining resident area association relationships at different times, according to the resident areas and the corresponding resident times;
   obtaining association relationships of different resident areas at different times, according to the area relationship model; and
   obtaining the association relationship between the resident areas of the target user, according to the resident areas at different times.

3. The method according to claim 1, wherein the determining a time-sequence relationship between areas visited by the target user, according to the association relationship, the resident times and the visiting POI data, comprises:
   performing a multi-source information fusion processing on the association relationship, the resident times, and the visiting POI data to obtain fused information; and
   inputting the fused information into a time-sequence relationship model to determine the time-sequence relationship between the areas visited by the target user, wherein the time-sequence relationship model is configured to reflect a time-sequence relationship of user migration behaviors.

4. The method according to claim 3, wherein the performing a multi-source information fusion processing on the association relationship, the resident times, and the visiting POI data to obtain fused information comprises:
   performing a pooling processing on the resident times and the visiting POI data respectively to obtain an intermediate representation vector; and
   performing a vector splicing processing on the intermediate representation vector and the association relationship to obtain the fused information.

5. The method according to claim 1, wherein the predicting a target resident area of the target user, according to the time-sequence relationship and basic attribute information of the target user, comprises:
   performing an aggregation processing on the time-sequence relationship and the basic attribute information of the target user;
   obtaining resident probabilities of the target user in different areas according to a result of the aggregation processing and a task for resident area prediction; and
   predicting the target resident area of the target user according to the resident probabilities of the target user in different areas.

6. The method according to claim 5, wherein the performing an aggregation processing on the time-sequence relationship and the basic attribute information of the target user comprises:
   converting the basic attribute information of the target user into a numeric value to obtain basic attribute data corresponding to the basic attribute information; and
   performing an aggregation processing on the time-sequence relationship and the basic attribute data.

7. The method according to claim 1, further comprising:
   performing an aggregation processing on the time-sequence relationship and the basic attribute information of the target user;
   obtaining a visiting intention probability of the target user in the target resident area, according to a result of the aggregation processing and a task for user visiting intention prediction; and
   determining the visiting intention of the target user in the target resident area, according to visiting intention probabilities of the target user corresponding to different categories of points of interest (POIs) in the target resident area.

8. The method according to claim 1, wherein the acquiring resident area data and visiting POI data of a target user comprises:
   converting resident area information and visiting POI information of the target user into numeric values respectively to obtain the resident area data corresponding to the resident area information and the visiting POI data corresponding to the visiting POI information.

9. The method according to claim 1, wherein the area relationship model is constructed according to resident areas of a user.

10. The method according to claim 9, wherein
    the area relationship model is further constructed by modeling a dynamic association relationship between the resident areas based on a dual-path graph convolutional network DGCN.

11. An apparatus for constructing an area relationship model, comprising: at least one processor and a memory communicatively connected with the at least one processor; wherein the memory stores instructions executable by the at least one processor, and the instructions are executed by the at least one processor to enable the at least one processor to execute the method according to claim 9.

12. A non-transitory computer-readable storage medium storing computer instructions for causing a computer to execute the method according to claim 1.

13. A resident area prediction apparatus, comprising: at least one processor and a memory communicatively connected with the at least one processor; wherein the memory stores instructions executable by the at least one processor, and the instructions are executed by the at least one processor to enable the at least one processor to:
    acquire resident area data and visiting point of interest (POI) data of a target user, wherein the resident area data comprises resident areas and corresponding resident times of the target user;
    input the resident area data into an area relationship model to obtain an association relationship between the resident areas of the target user, wherein the area relationship model is configured to reflect a position relationship between areas;
    determine a time-sequence relationship between areas visited by the target user, according to the association relationship, the resident times and the visiting POI data; and predict a target resident area of the target user, according to the time-sequence relationship and basic attribute information of the target user.

14. The apparatus according to claim 13, wherein the instructions are executed by the at least one processor to enable the at least one processor to:
   obtain resident area association relationships at different times, according to the resident areas and the corresponding resident times;
   obtain association relationships of different resident areas at different times, according to the area relationship model; and
   obtain the association relationship between the resident areas of the target user, according to the resident areas at different times.

15. The apparatus according to claim 13, wherein the instructions are executed by the at least one processor to enable the at least one processor to:
   perform a multi-source information fusion processing on the association relationship, the resident times, and the visiting POI data to obtain fused information; and
   input the fused information into a time-sequence relationship model to determine the time-sequence relationship between the areas visited by the target user, wherein the time-sequence relationship model is configured to reflect a time-sequence relationship of user migration behaviors.

16. The apparatus according to claim 15, wherein the instructions are executed by the at least one processor to enable the at least one processor to:
   perform a pooling processing on the resident times and the visiting POI data respectively to obtain an intermediate representation vector; and
   perform a vector splicing processing on the intermediate representation vector and the association relationship to obtain the fused information.

17. The apparatus according to claim 13, wherein the instructions are executed by the at least one processor to enable the at least one processor to:
   perform an aggregation processing on the time-sequence relationship and the basic attribute information of the target user;
   obtain resident probabilities of the target user in different areas according to a result of the aggregation processing and a task for resident area prediction; and
   predict the target resident area of the target user according to the resident probabilities of the target user in different areas.

18. The apparatus according to claim 17, wherein the instructions are executed by the at least one processor to enable the at least one processor to:
   convert the basic attribute information of the target user into a numeric value to obtain basic attribute data corresponding to the basic attribute information; and
   perform an aggregation processing on the time-sequence relationship and the basic attribute data.

19. The apparatus according to claim 13, wherein the instructions are executed by the at least one processor to enable the at least one processor to:
   perform an aggregation processing on the time-sequence relationship and the basic attribute information of the target user;
   obtain a visiting intention probability of the target user in the target resident area, according to a result of the aggregation processing and a task for user visiting intention prediction; and
   determine the visiting intention of the target user in the target resident area, according to visiting intention probabilities of the target user corresponding to different categories of points of interest (POIs) in the target resident area.

20. The apparatus according to claim 13, wherein the instructions are executed by the at least one processor to enable the at least one processor to:
   convert resident area information and visiting POI information of the target user into numeric values respectively to obtain the resident area data corresponding to the resident area information and the visiting POI data corresponding to the visiting POI information.

* * * * *